(No Model.)
B. T. BABBITT.
PROCESS OF EXTRACTING GLYCERINE FROM SALT SOAP LYE.
No. 256,614. Patented Apr. 18, 1882.
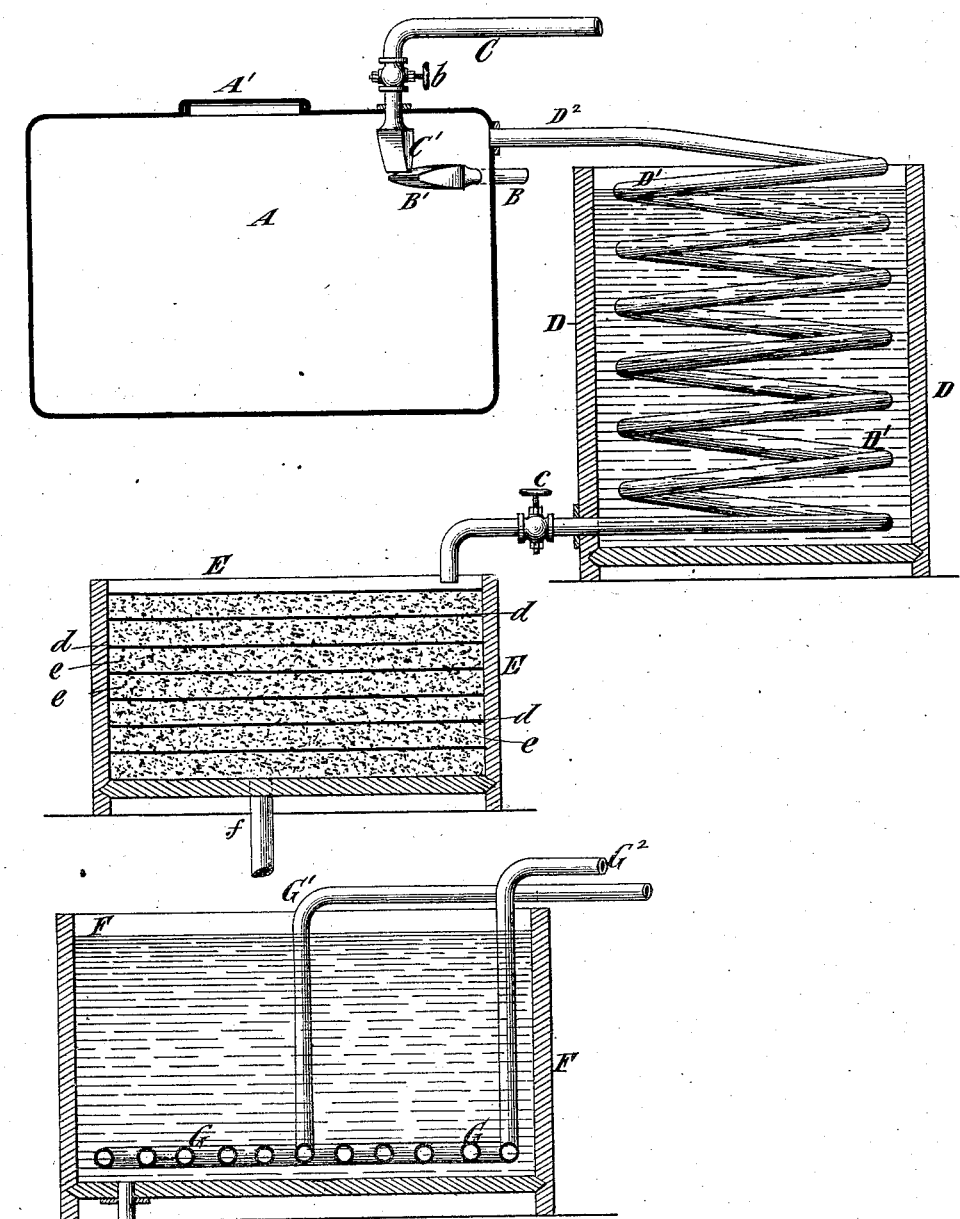

UNITED STATES PATENT OFFICE.

BENJAMIN T. BABBITT, OF NEW YORK, N. Y.

PROCESS OF EXTRACTING GLYCERINE FROM SALT SOAP-LYE.

SPECIFICATION forming part of Letters Patent No. 256,614, dated April 18, 1882.

Application filed December 6, 1881. (No model.)

*To all whom it may concern:*

Be it known that I, BENJAMIN T. BABBITT, of the city of New York, in the county and State of New York, have invented a certain new and Improved Process of Extracting Glycerine from Soap-Lyes, of which the following is a specification.

It is well known that the salt-lyes produced in the ordinary process of soap-making are rich in glycerine; but the extraction of the glycerine has heretofore been attended with considerable difficulty.

My improved process consists in atomizing or spraying the lye by means of superheated steam in a closed vessel, wherein the salt is deposited, while the spray is conducted through a condenser, and the liquid resulting from condensation is filtered and subsequently subjected to heat to evaporate the water.

The accompanying drawing represents a sectional view of an apparatus for carrying out my invention.

A designates a closed tank or vessel, which may be made of any suitable material, and which should be strong enough to resist a light internal pressure—say about two or three pounds to the square inch.

B designates a pipe through which the lye enters the tank or vessel A, and C designates a pipe through which steam, superheated to a temperature of about five hundred and fifty degrees (550°) Fahrenheit, enters the tank or vessel A under control of the cock or valve $b$.

The two pipes B and C are provided with atomizer-nozzles B' C', which may be flattened to give them greater width, and which may be slitted or perforated with fine holes. The steam escaping through the nozzle C' draws the lye through the pipe B and nozzle B' and atomizes it, or converts it into spray, and the salt of the lye is thereby freed from the liquid and deposited in the tank A. The said tank is provided with a suitable man-hole, A', through which access can be had to the interior for removing the salt deposited therein.

D designates a tank or vat, which may be made of wood, and which has arranged within it a condenser-coil, D'. This tank is kept filled with water, and the atomized liquid or spray passes from the tank or vessel A by a pipe, D², through the coil D', and the liquid resulting from condensation escapes from the coil under control of the valve $c$.

E designates a filter, which may consist of a wooden or other tank or vat, having a filling composed of felt $d$ and wood or animal charcoal $e$ or other suitable filtering material. From the condenser D the liquid flows into and through the filter E, wherein it is decolorized, and falls through a pipe, $f$, into a tank, F, in which is arranged a steam-coil, G, having inlet and outlet pipes G' G² for steam. The steam-coil G is employed to evaporate the surplus water contained in the liquid, and the glycerine resulting from such evaporation may be drawn off through the outlet-pipe H.

The apparatus which I employ is very simple and may be constructed at small cost, and by my process I overcome the difficulties which have been heretofore experienced in extracting glycerine from salt soap-lyes.

What I claim as my invention, and desire to secure by Letters Patent, is—

1. In the process of extracting glycerine from soap-lyes, the atomizing or spraying of the lyes by superheated steam, substantially as specified.

2. The process of extracting glycerine from soap-lyes, consisting in first atomizing or spraying the lyes by means of superheated steam, next condensing the spray, next filtering the liquid resulting from condensation, and finally evaporating the water contained in the liquid, substantially as specified.

B. T. BABBITT.

Witnesses:
HENRY T. BROWN,
T. J. KEANE.